June 15, 1926.
N. P. NELSON
1,588,851
DRIVE FOR TRACTOR LOADERS
Filed March 27, 1923  3 Sheets-Sheet 1
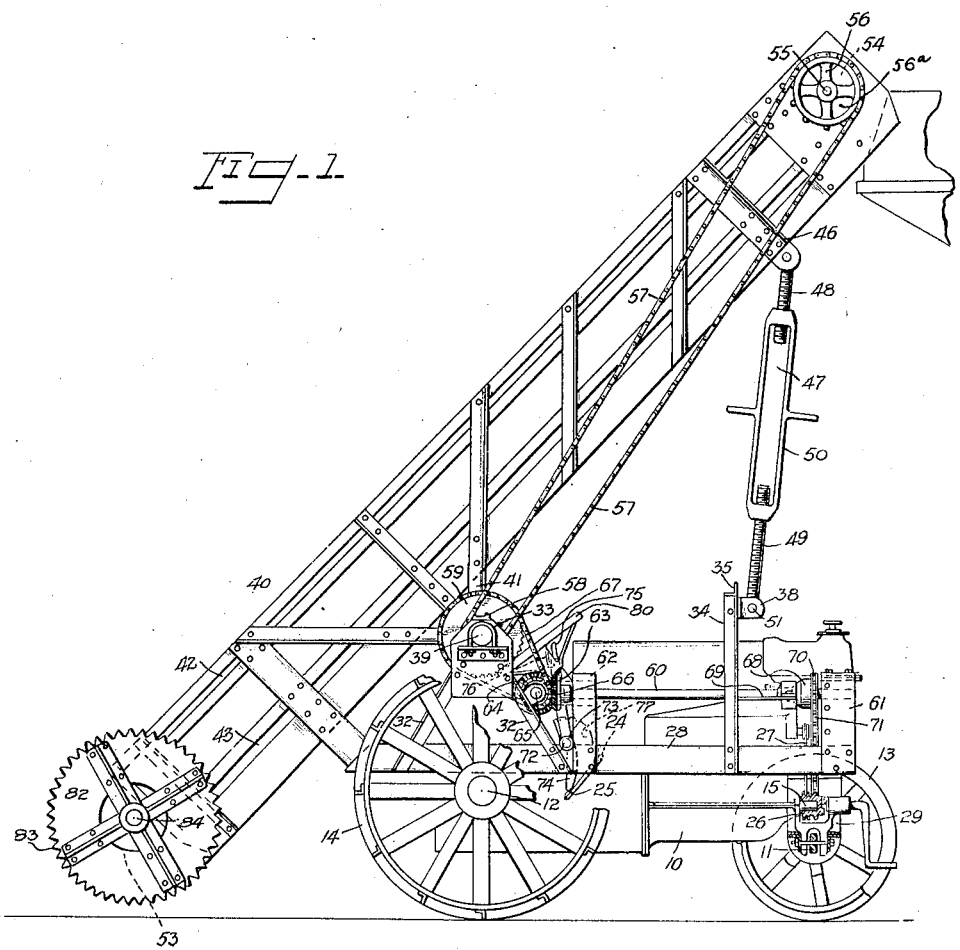
Inventor
Nels Peter Nelson
By his Attorney

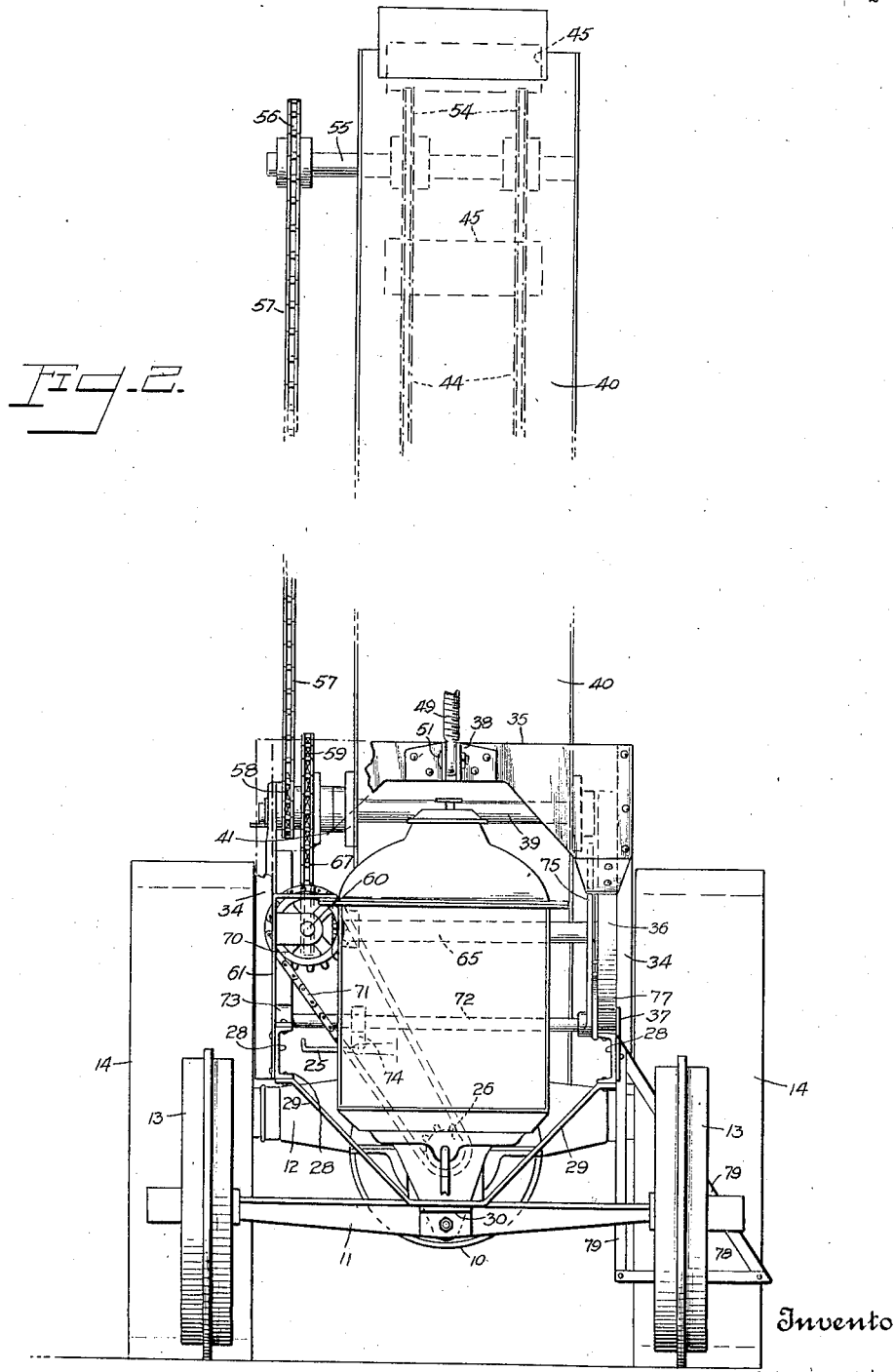

June 15, 1926.
N. P. NELSON
1,588,851
DRIVE FOR TRACTOR LOADERS
Filed March 27, 1923
3 Sheets-Sheet 3
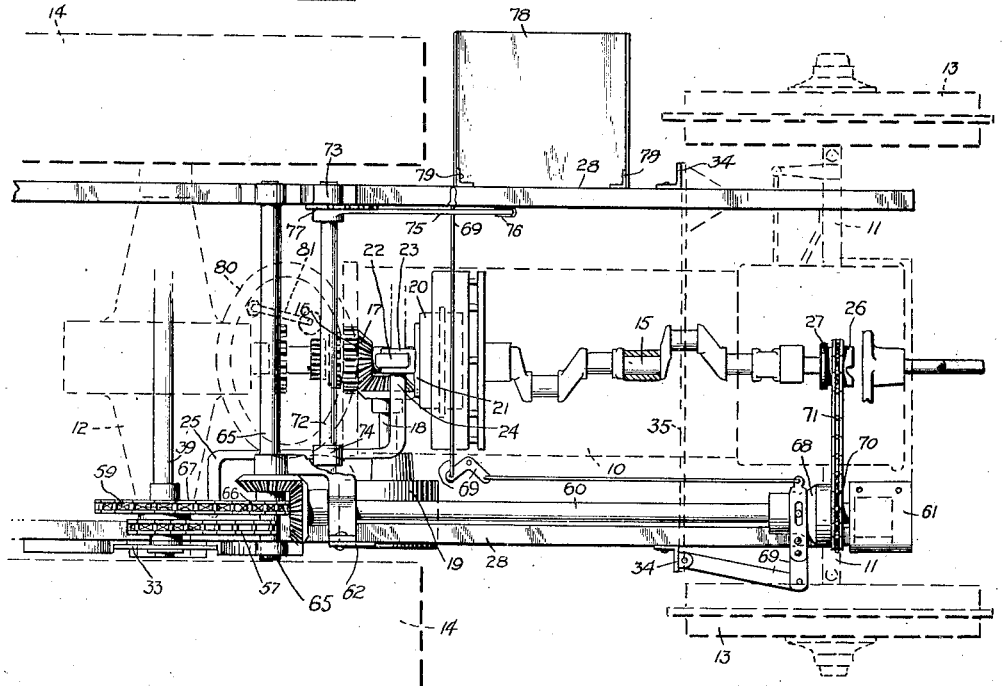
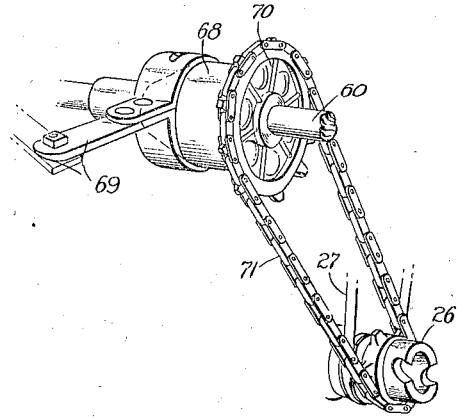
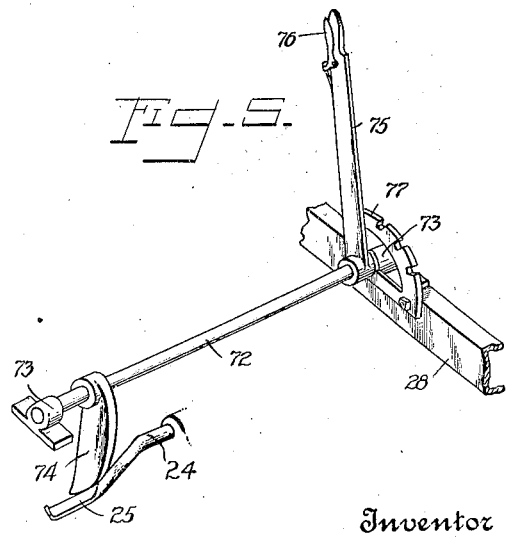
Inventor
Nels Peter Nelson
By his Attorney Patented June 15, 1926.

1,588,851

UNITED STATES PATENT OFFICE.

NELS PETER NELSON, OF BROOKLYN, NEW YORK.

DRIVE FOR TRACTOR LOADERS.

Application filed March 27, 1923. Serial No. 627,978.

My invention relates generally to wagon loading devices and more especially to a type of loading device which is supported and driven from a tractor, and which is provided with certain improvements in construction, whereby the elevator of the loading device may be driven continuously and directly from the tractor motor and entirely independently of the operation of the traction wheels of the tractor.

The particular tractor to which the present invention is especially adapted is generally known as the Fordson tractor which is of the general four wheel construction, i. e., steering wheels forward and traction wheels disposed rearwardly thereof. The motor is disposed forwardly of the tractor and power is transmitted rearwardly through a clutch, a transmission unit, and a differential gearing, to the traction wheel axle. The Fordson tractor is further provided with a power take-off-shaft and pulley arranged at the side of the differential gear casing; the take-off-shaft, as constructed, enters the casing and is provided with a bevel gear which meshes with a bevel gear mounted directly upon the drive shaft on the driven side of the clutch and between the latter and the transmission gear train. In this type of device to manipulate the tractor so that the latter will remain stationary while the power take-off-pulley is driven, it is necessary to throw the gear shift into neutral. This causes the power pulley to operate continuously as long as the clutch is engaged, but if it is desired to advance or back the tractor during continued operation of the power pulley the clutch must be "slipped" in order to bring the gears into mesh in the well known manner; as a result, the speed of the pulley is reduced and if it is carrying a load, operation of the driven element almost ceases.

There are several loading devices on the market which are carried and operated by the Fordson type of tractor, but in each device the power for driving the elevator is taken from the power take-off-pulley just described, and as a consequence, the supply of material contiguous to the feeder of the elevator being exhausted, it is necessary to back the tractor into closer proximity to a new supply of material, whereupon the clutch is "slipped" and the elevator conveyor is brought almost to a standstill. It will be apparent of course that during the operation of backing or "crowding" the loading device, the tractor must be moved slowly, an operation which in any case is taken care of by "slipping" the friction clutch, but in the arrangement just described the travel of the elevator will not be constant during the clutch slipping operation and all the disadvantages connected with an intermittently operated conveyor will be encountered. Without the "slipping" operation of the clutch, the tractor if thrown into reverse would simply "crowd" so rapidly that the conveyor could not take care of the material and the entire loading device and tractor would ride or climb over the pile.

With the foregoing in mind, it is the purpose of the present invention to avoid the use of the power take-off pulley, as a means for driving the elevator of the loading device, and in lieu thereof it is contemplated to take the power for driving the conveyor of the elevator directly from the motor crank shaft at a point entirely remote from the clutch and transmission mechanism. I accomplish this purpose by utilizing the projecting section of the motor crank shaft of the tractor, preferably between the crank case and the clutch for the crank handle, which section is now equipped with a pulley used to drive the ordinary motor fan, and in lieu of this pulley I provide a combination pulley and sprocket wheel, the latter portion of which may be coupled with the conveyor of the elevator through suitable mechanisms and control devices hereinafter described in detail.

It is a further object of the invention to enable an operator by proper manipulation of the control devices of the tractor, to "crowd" the loading device at any desired speed, slowly into a pile of material, fast for a thinly scattered layer of material, or held at a standstill if plenty of material is within reach of the feeders, all of such movements being effected while the elevator is being continuously operated at full capacity.

Still further objects of this invention are to provide a device of this character which is efficient in operation, easily manipulated, and durable in construction, and which is designed especially for use in connection with the Fordson type of power tractor.

The invention is illustratively exemplified in the accompanying drawings, in which, Figure 1 is a side elevational view of a Fordson tractor equipped with a loading device and my improved means for driving the latter directly from the engine; Figure 2 is a front elevational view of the same; Figure 3 is a plan view of the tractor and drive arrangement for the traction wheels and elevator of the loading device, the tractor being shown in dotted lines; and Figures 4 and 5 are detail perspective views of the improved power take-off-unit and clutch control mechanisms, respectively.

Referring to the drawings and more especially to the tractor itself, 10 denotes the motor crank case which is supported at opposite ends upon front and rear axles 11 and 12 having steering wheels 13 and traction wheels 14, respectively. The crank shaft 15 of the motor is clearly shown in Figure 3, and adjacent the rear end thereof the shaft 15 is coupled to a transmission and clutch mechanism 16. Slightly in advance of the transmission 16 between the latter and the clutch mechanism and geared to the crank shaft 15 through a pair of miter gears 17 is a power take-off-shaft 18 terminating on the outside of the crank casing 10 and having a pulley 19 keyed thereon. The clutch itself is designated 20 and is provided with the usual clutch release plate 21 operated by a clutch lever 22, the latter being pivoted intermediate its ends and provided with a curved upper portion adapted to be disposed in the path of a clutch release cam 23. The cam 23 is mounted on a transverse pedal shaft 24 which projects from the right side of the crank case 10 and carries a foot pedal 25 adjacent the said case. To disengage the clutch the pedal 25 is depressed, rocking the shaft 24 and rotating the cam 23, which in turn rocks the clutch lever 22 and acts on the clutch release plate 21 causing the clutch housing to move in a rearward direction and releasing the spring pressure against the clutch plates.

At the opposite end of the crank shaft 15, where it projects through the front end of the crank casing 10, I mount a combination fan pulley and sprocket wheel 26, the pulley being connected to the fan by means of a belt 27, and the sprocket being adapted to drive the elevator of a loading device through a chain and sprocket mechanism hereinafter described.

The parts just referred to are those which constitute the regular assembly of a Fordson tractor and in order to mount and support a wagon loading device, such as that shown in the drawing, it is necessary to attach a frame to the crank case 10, the frame being composed of a pair of parallel channel beams or sills 28 disposed longitudinally at opposite sides of the case and supported at their front ends upon U-shaped brackets 29. The brackets 29 are carried on opposite sides of the front axle 11 on L-shaped pieces 30 which are attached to the said axle centrally thereof. The rearwardly projecting ends of the sills 28 are supported upon blocks which rest upon the bearings for the traction wheel axle 12. Adjacent the rear ends of the sills 28 and attached thereto immediately over the rear axle 12 are a pair of inverted V-shaped steel pieces 32, which constitute a superstructure pivotally supporting the loading device, and which are provided with journals or bearings 33 at their uppermost vertices, the axes of the bearings being aligned and disposed transversely across the general axis of the tractor proper. Disposed forwardly of the sills 28 and slightly in the rear of the steering wheels 13 are a pair of upright steel members 34 arranged on opposite sides of the tractor and having their upper ends attached to a bridge plate 35, which extends over the tank of the tractor. One end of this plate 35, below the rivets attaching it to the left upright 34, is bent forwardly at an angle to receive the upper end of an inclined strengthening bar 36. The forward end of the bar 36 is attached to a plate 37 projecting upwardly from the extreme forwardly projecting end of the sill 28, as clearly illustrated in Figure 2. The superstructure just described carries an eye 38 disposed centrally of the bridge piece 35 and from which a turn-buckle arrangement is carried to control the inclination of the loading device.

Referring now particularly to the loading device, 39 denotes a pivot shaft journaled adjacent opposite ends in the bearings 33. Mounted to oscillate about this shaft 39 is the loader proper which consists of a steel structure 40 having depending bearings 41 adjacent the rearward end thereof, the bearings being adapted to turn about the said shaft 39. The loader further comprises a pair of parallel guideways 42 and 43 in which a continuous conveyor 44 is adapted to traverse in the usual manner. The conveyor 44 is provided with flights or buckets 45 which carry material through the uppermost guideway 42 and return empty through the under guideway 43. Adjacent the delivery end of the loader frame 40 the latter is provided with a U-shaped strap 46, in the midportion of which is attached the upper end of a turn-buckle arrangement 47 which comprises an upper rod 48 and a lower rod 49, and a turn-buckle 50 adjustably mounted over the adjacent ends of the rods. The lower rod 49 is pivotally mounted on a pin 51 disposed in the eye 38 attached to the bridge piece 3⁵, as previously explained.

By manipulation of the turn-buckle 50 the rods 48 and 49 are adjusted toward or away from each other whereby the loader changes its inclination about the pivot shaft 39 and the feeding end of the device receives relative adjustment with respect to the ground and material into which it is being crowded.

The conveyor 44 passes at its lower end, i. e., the feed end of the elevator, about a foot roller 53 and at the opposite or delivery end about a head roller 54. The head roller 54 is mounted upon a rotary driven shaft 55 which bears in suitable bearings 56$^a$ in the elevator frame 40, and which carries a sprocket 56 externally of the said frame and on the right side of the loader, as shown in Figure 2. The sprocket 56 is driven by a continuous sprocket chain 57 passing about a sprocket 58 loosely mounted upon the pivot shaft 39. The sprocket 58 is attached to a driven sprocket 59 disposed between the former and the elevator and which is of substantially greater diameter than the sprocket 58.

Referring particularly to Figures 3 and 4, I have illustrated one embodiment of my improved elevator or drive which receives its power directly from the front of the motor and which comprises a longitudinally disposed clutch shaft 60 mounted in a suitable bearing carried by a forward upright support 61. The support 61 comprises a steel bar attached at its lower end to the sill 28 and at its upper end the bar is bent inwardly at right angles and attached to the flange of the radiator of the tractor. Looking towards the front of the tractor the bar 61 and the clutch shaft 60 are arranged at the right side of the tractor and at an elevation substantially on a plane coinciding with the top of the motor, i. e., between the shaft 39 and the sill 28. The rearwardly projecting end of the clutch shaft 60, beyond a bearing carried by a second upright 62 attached to the sill 28, carries a bevel gear 63 which meshes with a bevel gear 64, the latter being carried by a counter shaft 65 rotatably mounted in suitable bearings carried by the V frames 32 at both sides of the tractor. In the angle between the bevel gears 63 and 64 the counter shaft 65 carries a sprocket wheel 68 which is aligned with the sprocket 59 and drives the latter through an endless sprocket chain 67 disposed about the two sprockets.

The forward end of the clutch shaft 60 carries the members of a friction clutch device 68 which may be any of the well known types and which necessarily will be controlled from the station of the operator through connecting means indicated generally at 69. The power side of the clutch 68 is provided with a sprocket wheel 70 which is aligned with the sprocket wheel portion of the member 26 through an endless sprocket chain connection 71, clearly illustrated in Figures 2 and 4. This construction completes the assembly of the elevator driving means for the loader and it will be noted that the mechanism itself and the control therefor are disposed entirely independently of the traction and power-take-off devices, so that the latter may be controlled and manipulated without in any way affecting the rate of speed of the drive for the loader.

Referring now to the clutch control for the traction wheel drive or transmission 16, attention is directed especially to Figure 5 in which 72 denotes a shaft supported in bearings 73 on the sills 28, and disposed substantially parallel to and on a plane slightly above and rearwardly of the axis of the clutch pedal shaft 24. One end of the shaft 72 carries a cam 74, having a cam surface so shaped as to engage the pedal 25 and to depress it into its disengaged position, while maintaining contact with the pedal 25 at a point near its outer extremity, thus retaining its leverage against the increasing resistance of the clutch spring. The opposite end of the shaft 72, at the left side of the tractor looking towards the front thereof, is provided with a lever arm 75 having a latch control 76 which engages the teeth of a sector plate 77 attached to the sill 28 adjacent the shaft 72.

When a loading device of this character is carried by a Fordson tractor the latter is usually manipulated from one side thereof and preferably at a station slightly in advance of the traction wheels 14 and at the left side of the machine. This station in the present construction comprises a step platform 78 suspended upon depending steel angle irons 79 which are attached to the sill 28. Referring to Figure 3 it will be apparent that the operator standing on the platform 78 will be within reach of the steering wheel 80, gear shifter lever 81, clutch control lever 75, and elevator clutch control 69.

A completed assembly of the loader, of the type shown in the present embodiment of my invention, comprises a spiral self feeder device indicated at 82 which includes oppositely arranged spiral blades 83 mounted upon the foot shaft 84 at opposite sides of the foot roller or sprocket 53.

The operation of the device is as follows:—Both control clutches 20 and 68 are held in released position and the motor is in operation, whereupon the gear shifter lever is shifted from neutral into reverse and the clutch lever 75 lowered to permit the pedal 25 to rise and engage the clutch members 20. This operation will cause the tractor to move backwardly and as a result of such movement the spiral feeder 82 will crowd the pile of material to be loaded.

Before or subsequent to the movement of the tractor, the other clutch control 69 may be operated to cause the power from the sprocket and chain connection with the forepart of the crank shaft 15 to be transmitted to the clutch shaft 60, bevel gears 63 and 64, counter shaft 65 and thus operating the elevator through sprocket wheel 66 and chain 67 to the elevator drive sprocket 59.

The particular advantages in manipulating the apparatus, as described above, will be apparent when it is understood that when the gear shift and friction clutch are entirely separate from the elevator drive, the loader may be made to crowd at any desired speed, without affecting the speed at which the conveyor is continuously traveling. This operation is controlled by control apparatus within reach of the operator at one station on the tractor and while the elevator is operating at its full capacity.

While I have shown and described one way in which the general principles may be carried into effect, it will be obvious that variations and modifications therein may be required or desired to meet particular conditions of use, and I desire to be understood as reserving the right to make any and all such changes or modifications as may be found necessary or desirable in so far as the same may fall within the spirit and scope of the invention as set forth in the accompanying claims when broadly construed.

Having described my invention what I claim and desire to secure by Letters Patent is:—

1. In a tractor of the character described, the combination with a wagon-loading device, of means for receiving power directly from the motor of the tractor and applying the said power to the elevator of the loading device, said means comprising a sprocket mounted on the crank shaft of the motor in the tractor, a clutch shaft longitudinally disposed with respect to the tractor at one side thereof, driving means between the said sprocket and the clutch shaft, a clutch control device carried by said clutch shaft, and means for transmitting power from the clutch shaft to the elevator of the loading device, substantially as described.

2. In a combination tractor and loading device of the character described, including power means for driving the tractor, transmission and clutch mechanism disposed between the said power means and the traction members of the tractor, means for operating the loading device independently of the operation of the tractor, said means being directly coupled to the said power means and comprising a continuously driven sprocket and chain connection from the crank shaft of the power means, a clutch device connected to said sprocket and chain connection, and means for controlling the loader from the last named clutch, whereby the tractor and the loader may be independently driven at the same or different speeds.

3. In a combination tractor and loading device of the character described, means for operating the loading device from the tractor independently of the traction of the tractor, a clutch and transmission device between the tractor motor and the traction wheels, a clutch control means for operating the said clutch including a foot pedal disposed at one side of the tractor, and a pedal operating device comprising a counter shaft carried by said tractor, a cam disposed at one end thereof and adapted to operate against the said pedal to release or engage the clutch, said cam being adapted to contact with the pedal closely adjacent the outer end of the latter, and a lever and sector control at the opposite end of said counter shaft for changing and fixing the position of the said cam with respect to the pedal, the said lever and sector control being disposed at a remote station in the tractor with respect to the foot pedal.

In testimony whereof I affix my signature.

NELS PETER NELSON.